United States Patent [19]
Tabe et al.

[11] Patent Number: 5,982,750
[45] Date of Patent: Nov. 9, 1999

[54] SIMPLE CONNECTION ADMISSION CONTROLLING SYSTEM AND METHOD CAPABLE OF CONTROLLING, IN A HIGH SPEED, ADMISSION OF CALL

[75] Inventors: Takashi Tabe; Makiko Yoshida, both of Tokyo, Japan

[73] Assignee: NEC Corporation, Tokyo, Japan

[21] Appl. No.: 08/812,709

[22] Filed: Mar. 6, 1997

[30] Foreign Application Priority Data

Mar. 7, 1996 [JP] Japan .................................. 8-049949

[51] Int. Cl.[6] .............................. H04L 12/26; H04L 12/56
[52] U.S. Cl. .......................... 370/233; 370/252; 370/477
[58] Field of Search .................................. 370/229, 230, 370/231, 232, 233, 234, 235, 252, 253, 389, 395, 465, 468, 477; 709/232, 233, 234, 235

[56] References Cited

U.S. PATENT DOCUMENTS

| | | | |
|---|---|---|---|
| 5,530,695 | 6/1996 | Dighe et al. ............................. | 370/232 |
| 5,583,857 | 12/1996 | Soumiya et al. ........................ | 370/233 |
| 5,594,717 | 1/1997 | Watanabe et al. ....................... | 370/232 |
| 5,862,126 | 1/1999 | Shah et al. .............................. | 370/230 |
| 5,872,771 | 2/1999 | Park et al. .............................. | 370/252 |

FOREIGN PATENT DOCUMENTS 5-167608   7/1993   Japan .

OTHER PUBLICATIONS

H. Suzuki et al., "Performance Comparison of Fast Bandwidth Reservation Schemes in ATM Networks", *Proceedings of the 1992 IEICE Fall Conference*, Sep. 27–30, 1992, Tokyo, Japan, pp. 3–149.

C. Ikeda et al., "Congestion Control Schemes for Best Effort Services in ATMLAN", *Technical Report of IEICE*, IN93–109, Jan. 1994, pp. 19–24.

H. Suzuki et al., "ATM Oriented Multimedia LAN Architecture", *The Transactions of The Institute of Electronics, Information and Communications Engineers*, vol. J.76–B–I, No. 11. Nov. 1993, pp. 869–881.

C. Ikeda et al., "Comparison of Fast Bandwidth Reservation Schemes in ATM Networks", *Proceedings of the 1992 IEICE Fall Conference*, Sep. 27–30, 1992, Tokyo, Japan, pp. 3–147.

F. Tobagi et al., "Fast Bandwidth Reservation Scheme with Multi–path & Multi–link Routing in ATM Networks", *SSE 91–112*, vol. 91, No. 334, Nov. 22, 1991, pp. 31–36.

Guérin et al., "Equivalent Capacity and Its Application to Bandwidth Allocation in High–Speed Networks", *IEEE Journal on Selected Areas in Communications*, vol. 9, No. 7, Sep. 1991, pp. 968–981.

Chen–Shang Chang, "Stability, Queue Length, and Delay of Deterministic and Stochastic Queueing Networks",*IEEE Transactions on Automatic Control*, vol. 39, No. 5, May 1994, pp. 913–931.

N. G. Duffield et al., "Entropy of ATM Traffic Streams: A Tool for Estimating QoS Parameters", *IEEE Journal on Selected Areas in Communications*, vol. 13, No. 6, Aug. 1995, pp. 981–990.

*Primary Examiner*—Alpus H. Hsu
*Attorney, Agent, or Firm*—Sughrue, Mion, Zinn, Macpeak & Seas, PLLC

[57] ABSTRACT

In a connection admission controlling system, a call admission processing and allocating device judges whether or not a call is admitted in response to a peak rate of a traffic and allocates, as a temporary bandwidth, the peak rate to the call when the call is admitted. A resource controlling device has a connection call controlling table which holds call connection data of calls each of which has at least one of the temporary bandwidth and an effective bandwidth. A traffic measuring device measures a traffic of the call to produce a measured traffic. An effective bandwidth computing and allocating device has a new call controlling table which holds new call connection data representing data of calls each of which have the temporary bandwidth. The effective bandwidth computing and allocating device computes the effective bandwidth by using the measured traffic and allocates the effective bandwidth to the call.

9 Claims, 8 Drawing Sheets

SIMPLE CONNECTION ADMISSION CONTROLLING SYSTEM AND METHOD CAPABLE OF CONTROLLING, IN A HIGH SPEED, ADMISSION OF CALL

BACKGROUND OF THE INVENTION

This invention relates to connection admission controlling system and method in an ATM (asynchronous transfer mode) network, and more particularly, to connection admission controlling system and method which are based on measuring a traffic of a call.

Description of the Related Art

The connection admission controlling system in an ATM network prevents admission of a call which can not be accommodated in the network. Thereby, the connection admission controlling system prevents deterioration of communication quality. The connection admission controlling system needs capacities for maintaining the communication quality, for efficiently utilizing resources of the network, and for carrying out, at a real time and at a high speed, process of connection admission of the call. The connection admission controlling system generally approximates a real traffic to a traffic model which is previously set in response to a traffic descriptor which is proposed by a user by use of a calling station when the call is received. Thereby, the connection admission controlling system carries out appreciation of such as the communication quality to make a judging reference for reception of the call.

In the manner which will be described more in detail, a conventional connection admission controlling system is supplied with a traffic descriptor having an average rate and a peak rate of a traffic of a call. The traffic descriptor is included in a connectivity restriction of a connectivity cell from one of calling stations. The average rate and the peak rate are proposed by a user by use of the calling station. The conventional connection admission controlling system judges whether or not a call is required, namely, whether or not the connection admission controlling system is supplied with the connectivity restriction of the connectivity cell from the one of calling stations. When the connection admission controlling system is supplied with the connectivity restriction of the connectivity cell, the connection admission controlling system computes a necessary bandwidth of the call by using a predetermined computing method which computes the necessary bandwidth of the call in response to the average rate and the peak rate which are proposed. The connection admission controlling system judges whether or not the call is admitted in response to the necessary bandwidth.

However, it is difficult that the user previously knows the traffic descriptor. Also, there is a problem that the traffic descriptor proposed has an unstable reliability.

Another conventional connection admission controlling system is disclosed in Japanese Unexamined Patent Prepublication (kokai) No. 167608/1993. The conventional connection admission controlling system controls connection admission in response to the traffic descriptor and measurement of the traffic. The conventional connection admission controlling system is applied to a network of bufferless models that do not have a buffer. However, the conventional connection admission controlling system is not applied to many networks which have buffers and which presently are used.

In conventional connection admission controlling systems, since the systems generally approximate real traffics to traffic models, the systems do not have capacities for maintaining the communication quality, and for efficiently utilizing resources of the network when the systems are supplied with calls which have many different traffic caharacteristics.

SUMMARY OF THE INVENTION

It is therefore an object of this invention to provide connection admission controlling system and method which have capacities for maintaining the communication quality, and for efficiently utilizing resource of the network even when the system and the method are supplied with calls which have many different traffic cahracteristics.

It is another object of this invention to provide connection admission controlling system and method which are applied to many networks which have buffers and which presently are used.

It is yet another object of this invention to provide connection admission controlling system and method which have capacities for carrying out, at a real time and at a high speed, processes of connection admission of the calls.

Other objects of this invention will become clear as the description proceeds.

According to a first aspect of this invention, there is provided a connection admission controlling system comprising:

judging means for judging whether or not a call from one of calling stations is admitted in response to a peak rate of a traffic that is indicated by a connectivity restriction of a connectivity cell from the one of the calling stations to produce a call admitted signal when the call is admitted;

first allocating means connected to the judging means for allocating, as a temporary bandwidth, the peak rate to the call when the allocating means is supplied with the call admitted signal;

measuring means connected to the first allocating means for measuring a traffic of the call from the one of the calling stations to produce a measured traffic after the measuring means is supplied with the call admitted signal;

computing means connected to the measuring means for computing an effective bandwidth by using the measured traffic when the computing means is supplied with the measured traffic; and second allocating means connected to the computing means for allocating the effective bandwidth to the call when the second allocating means is supplied with the effective bandwidth.

According to a second aspect of this invention, there is provided a connection admission controlling system comprising:

judging means for judging whether or not a call from one of calling stations is admitted in response to a peak rate of a traffic that is indicated by a connectivity restriction of a connectivity cell from the one of the calling stations to produce a call admitted signal when the call is admitted;

first allocating means connected to the judging means for allocating, as a temporary bandwidth, the peak rate to the call when the allocating means is supplied with the call admitted signal;

measuring means connected to the first allocating means for measuring traffics of the call from the one of the calling stations to produce measured traffics after the measuring means is supplied with the call admitted signal;

computing means connected to the measuring means for gradually computing first through m-th effective bandwidths by using the measured traffics when the computing means is supplied with the measured traffics from the measuring means, where m represents an integer greater than two; and second allocating means connected to the computing means for allocating the first through m-th effective bandwidths to the call, respectively, when the second allocating means is supplied with the first through m-th effective bandwidths.

According to a third aspect of this invention, there is provided a connection admission controlling system comprising:

a call admission processing and allocating device for judging whether or not a call from one of calling stations is admitted in response to a peak rate of a traffic that is indicated by a connectivity restriction of a connectivity cell from the one of the calling stations to produce a call admitted signal when the call is admitted, the call admission processing and allocating device allocating, as a temporary bandwidth, the peak rate to the call when the call admitted signal is produced;

a resource controlling device connected to the call admission processing and allocating device and having a connection call controlling table which holds call connection data of calls each of which has at least one of the temporary bandwidth and an effective bandwidth, the connection call controlling table holds the temporary bandwidth and the effective bandwidth when the resource controlling device is supplied with the temporary bandwidth from the call admission processing and allocating device and the effective bandwidth, the resource controlling device controlling usage of a link by using the call connection data of the calls;

a traffic measuring device connected to the call admission processing and allocating device for measuring a traffic of the call from the one of the calling stations to produce a measured traffic after the traffic measuring device is supplied with the call admitted signal; and an effective bandwidth computing and allocating device connected to the call admission processing and allocating device, the traffic measuring device, and the resource controlling device and having a new call controlling table which holds new call connection data representing data of calls each of which have the temporary bandwidth, the effective bandwidth computing and allocating device computing the effective bandwidth by using the measured traffic when the effective bandwidth computing and allocating device is supplied with the measured traffic, the effective bandwidth computing and allocating device allocating the effective bandwidth to the call and supplying the effective bandwidth to the resource controlling device.

According to a fourth aspect of this invention, there is provided a connection admission controlling system comprising:

a call admission processing and allocating device for judging whether or not a call from one of calling stations is admitted in response to a peak rate of a traffic that is indicated by a connectivity restriction of a connectivity cell from the one of the calling stations to produce a call admitted signal when the call is admitted, the call admission processing and allocating device allocating, as a temporary bandwidth, the peak rate to the call when the call admitted signal is produced;

a resource controlling device connected to the call admission processing and allocating device and having a connection call controlling table which holds call connection data of calls each of which has at least one of the temporary bandwidth and an effective bandwidth, the connection call controlling table holds the temporary bandwidth and the effective bandwidth when the resource controlling device is supplied with the temporary bandwidth from the call admission processing and allocating device and the effective bandwidth, the resource controlling device controlling usage of a link by using the call connection data of the calls;

a traffic measuring device connected to the call admission processing and allocating device for measuring traffics of the call from the one of the calling stations to produce measured traffics after the traffic measuring device is supplied with the call admitted signal; and an effective bandwidth computing and allocating device connected to the call admission processing and allocating device, the traffic measuring device, and the resource controlling device and having a new call controlling table which holds new call connection data representing data of calls each of which have the temporary bandwidth, the effective bandwidth computing and allocating device gradually computing first through m-th effective bandwidths by using the measured traffics when the computing means is supplied with the measured traffics from the traffic measuring device, where m represents an integer greater than two, the effective bandwidth computing and allocating device allocating the first through m-th effective bandwidths to the call, respectively, the effective bandwidth computing and allocating device supplying the first through m-th effective bandwidths to the resource controlling device.

According to a fifth aspect of this invention, there is provided a connection admission controlling method comprising;

a first step of judging whether or not a call from one of calling stations is admitted in response to a peak rate of a traffic that is indicated by a connectivity restriction of a connectivity cell from the one of the calling stations to produce a call admitted signal when the call is admitted;

a second step of allocating, as a temporary bandwidth, the peak rate to the call in response to the call admitted signal;

a third step of measuring a traffic of the call from the one of the calling stations to produce a measured traffic after reception of the call admitted signal;

a fourth step of computing an effective bandwidth by using the measured traffic; and a fifth step of allocating the effective bandwidth to the call.

According to a sixth aspect of this invention, there is provided a connection admission controlling method comprising:

a first step of judging whether or not a call from one of calling stations is admitted in response to a peak rate of a traffic that is indicated by a connectivity restriction of a connectivity cell from the one of the calling stations to produce a call admitted signal when the call is admitted;

a second step of allocating, as a temporary bandwidth, the peak rate to the call in response to the call admitted signal;

a third step of measuring traffics of the call from the one of the calling stations to produce measured traffics after reception of the call admitted signal;

a fourth step of gradually computing first through m-th effective bandwidths by using the measured traffics where m represents an integer greater than two; and a fifth step of allocating the first through m-th effective bandwidths to the call, respectively.

DESCRIPTION OF THE PREFERRED EMBODIMENTS

Figure 1:
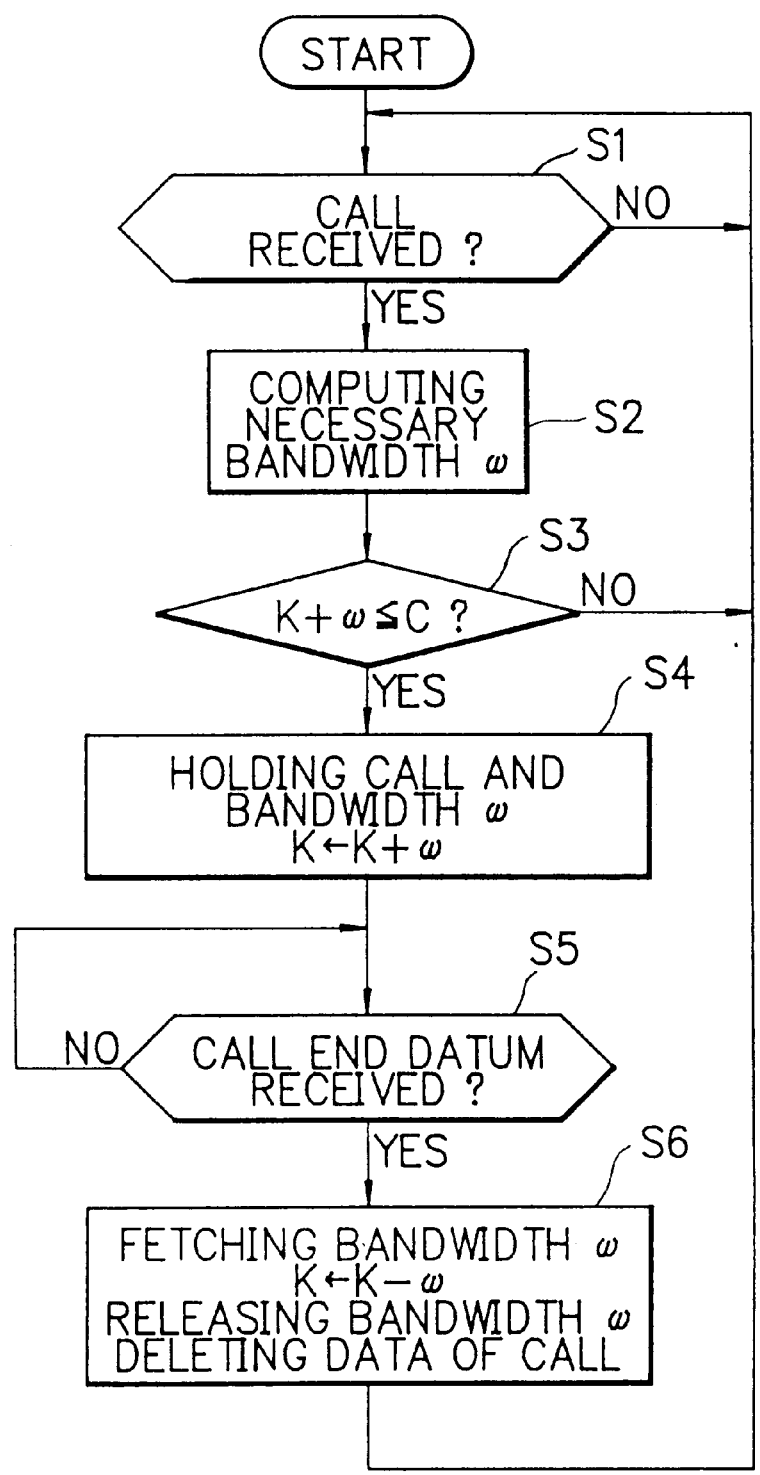
FIG. 1 is a flow chart for use in describing operation of a conventional connection admission controlling system.

Referring to FIG. 1, a conventional connection admission controlling system will first be described for a better understanding of this invention.

The conventional connection admission controlling system is supplied with a traffic descriptor having an average rate and a peak rate of a traffic of a call. The traffic descriptor is included in a connectivity restriction of a connectivity cell from one of the calling stations. The average rate and the peak rate are proposed by a user by use of the calling station. In FIG. 1, at a step S1, the conventional connection admission controlling system judges whether or not the call is received, namely, whether or not the connection admission controlling system is supplied with the connectivity restriction of the connectivity cell from the one of the calling stations. When the connection admission controlling system is supplied with the connectivity restriction of the connectivity cell, the step S1 proceeds to a step S2. At the step S2, the connection admission controlling system computes a necessary bandwidth w of the call by using a predetermined computing method for computing the said necessary bandwidth w of the call in response to the average rate and the peak rate which are proposed. The connection admission controlling system comprises a first memory section which memorizes a parameter c representing a whole bandwidth of a link and a second memory section which memorizes a parameter K representing a bandwidth which is presently used. In the predetermined computing method, it is assumed that the call is followed to Markov fluid model in two states. For example, the predetermined computing method is described in "Guerin et al,:Equivalent Capacity and Its Application to Bandwidth Allocation in High-Speed Networks. IEEE JOURNAL ON SELECTED AREAS IN COMMUNICATIONS. VOL.9 NO. 7, p. 968 to 981 SEPTEMBER 1991".

The step S2 proceeds to a step S3 at which the connection admission controlling system judges whether or not (K+w) is smaller than to c. When (K+w) is smaller than c, the link has a free bandwidth which can accommodate the call. Therefore, when (K+w) is smaller than c, the call is admitted. Also, when (K+w) is not smaller than c, the call is not admitted. When (K+w) is smaller than c, the step S3 proceeds to a step S4. Otherwise, the step S3 returns to the step S1. The connection admission controlling system comprises a connection call controlling table which controls calls connected. At the step S4, the connection admission controlling system holds the call and the connection admission controlling system holds the bandwidth w. Also, the connection admission controlling system sets a value of K to (K+w).

The step S4 proceeds to a step S5 at which the connection admission controlling system determines whether or not the connection admission controlling system is supplied with a call end datum of an end cell that represents an end of the call. When the connection admission controlling system is supplied with the call end datum, the step S5 proceeds to a step S6. Otherwise, the step S5 is repeated. At the step S6, the connection admission controlling system fetches the bandwidth w of the call from the connection call controlling table. Therefore, the connection admission controlling system sets the value of K to (K−w). Thus, the connection admission controlling system releases the bandwidth w which is occupied by the call. Thereafter, the connection admission controlling system deletes data of the call from the connection call controlling table. The step S6 returns to the step S1. However, it is difficult that the user previously knows the traffic descriptor. Also, there is a problem that the traffic descriptor proposed has an unstable reliability.

Referring to FIGS. 2, 3, 4, 5, and 6, the description will proceed to connection admission controlling system and method according to a first embodiment of this invention.

Figure 2:
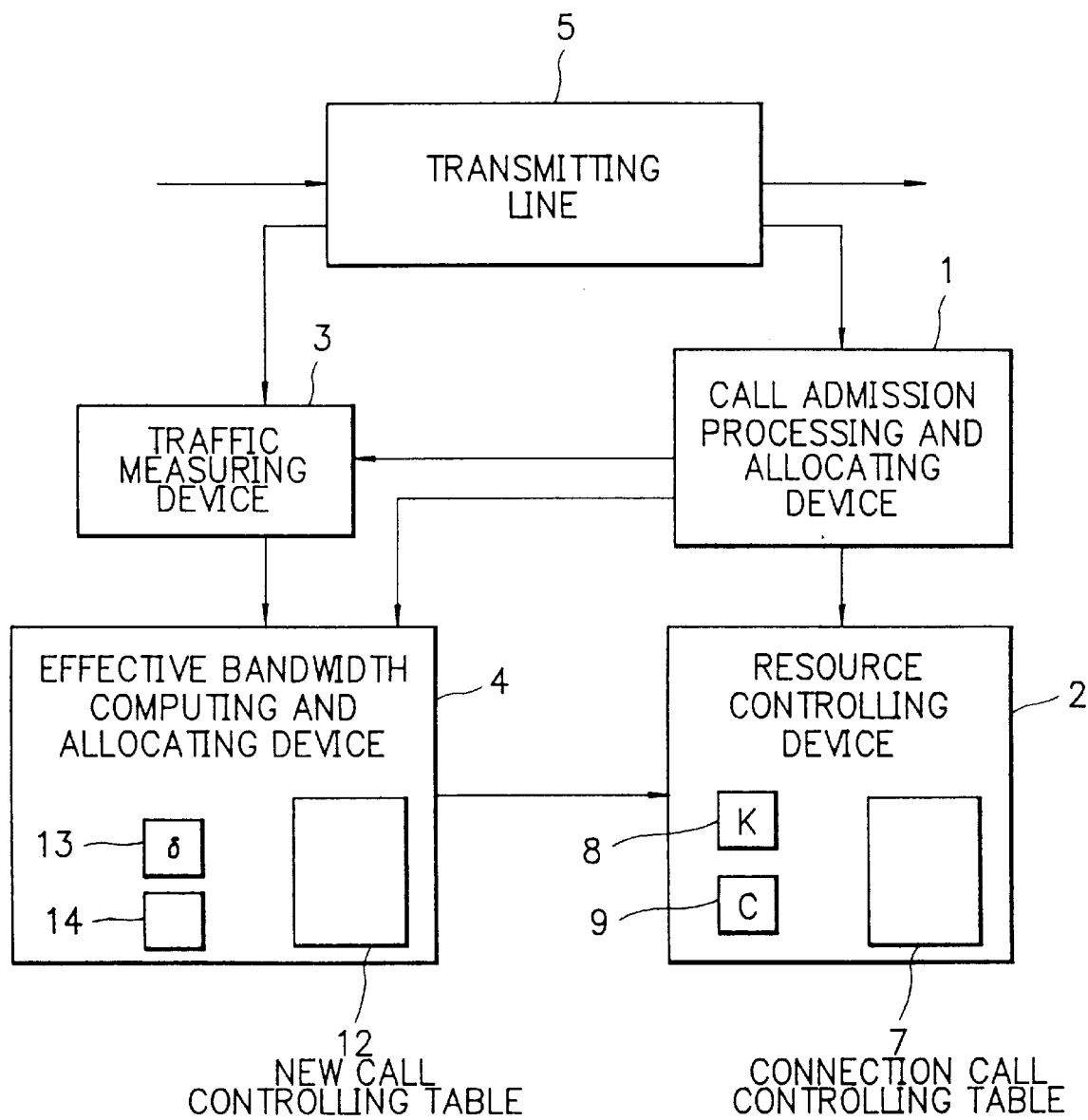
FIG. 2 is a block diagram of a connection admission controlling system according to a first embodiment of this invention.

In FIG. 2, the connection admission controlling system comprises a call admission processing and allocating device 1, a resource controlling device 2, a traffic measuring device 3, and an effective bandwidth computing and allocating device 4. The call admission processing and allocating device 1 is connected to a transmitting line 5. The resource controlling device 2 is connected to call admission processing and allocating device 1. The traffic measuring device 3 is connected to the transmitting line 5 and the call admission processing and allocating device 1. The effective bandwidth computing and allocating device 4 is connected to the call admission processing and allocating device 1, the resource controlling device 2, and the traffic measuring device 3.

The transmitting line 5 is supplied with calls from calling stations (not shown). The call comprises a connectivity cell, cells following the connectivity cell, and an end cell following the cells. The connectivity cell has a connectivity restriction. The connectivity restriction has a call identifier word, a peak rate of a traffic, and a datum of a destination. The peak rate of the traffic and the datum of the destination are proposed by the user by use of the calling station. Each of the cells has the call identifier word. The end cell has the call end datum and the call identifier word.

The call admission processing and allocating device 1 is supplied with the peak rate of the traffic that is indicated by the connectivity restriction of the connectivity cell from one of the calling stations. The call admission processing and allocating device 1 is further supplied with a present bandwidth which presently is used in a link and a whole bandwidth of the link from the resource controlling device 2. The call admission processing and allocating device 1 judges whether or not the call is admitted in response to the peak rate, the present bandwidth, and the whole bandwidth of the link to produce the call admitted signal when the call is admitted. The call admission processing and allocating device I allocates, as a temporary bandwidth, the peak rate to the call when the call admitted signal is produced. The call admission processing and allocating device 1 is supplied with the call end datum and the call identifier word of the end cell and supplies the call end datum and the call identifier word of the end cell to the resource controlling device 2.

The resource controlling device 2 has a connection call controlling table 7 which holds call connection data of the calls each of which has at least one of the temporary bandwidth and an effective bandwidth. The connection call controlling table 7 holds the temporary bandwidth and the effective bandwidth when the resource controlling device 2 is supplied with the temporary bandwidth from the call admission processing and allocating device 1 and the effective bandwidth from the effective bandwidth computing and allocating device 4. The resource controlling device 2 further has a first resource memory section 8 which memorizes a parameter K representing the present bandwidth which presently is used in the link and a second resource memory section 9 which memorizes a parameter c representing the whole bandwidth of the link. The resource controlling device 2 controls usage of the link by using the call connection data of the calls, the present bandwidth, and the whole bandwidth of the link.

Figure 3:
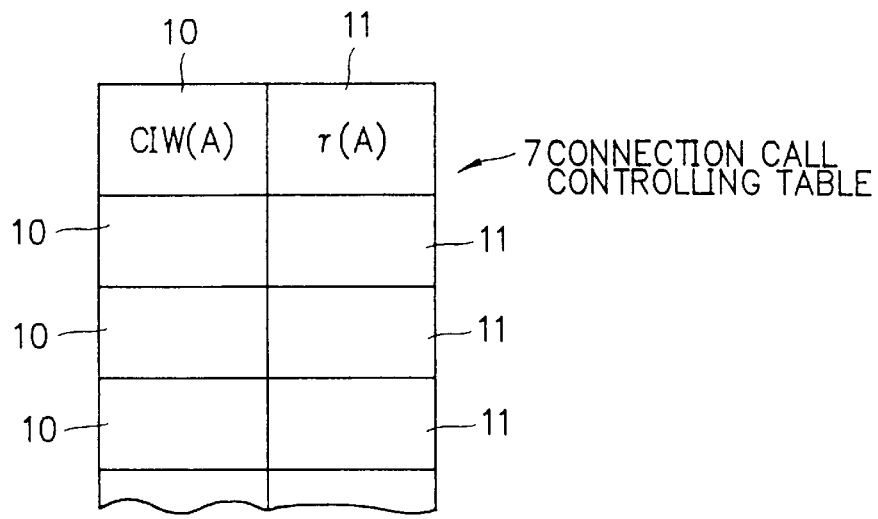
FIG. 3 is a view for use in describing a resource controlling device of the connection admission controlling system illustrated in FIG. 2.

As shown in FIG. 3, the connection call controlling table 7 has call identifier word holding fields 10 and bandwidth data holding fields 11. Each of the call identifier word holding fields 10 has a identifier word such as VCI. Each of the bandwidth data holding fields 11 has a present bandwidth which is allocated to the call which has the call identifier word in the call identifier word holding field 10 corresponding to the bandwidth data holding field 11. When the call connection data of the call A is entered in the connection call controlling table 7, it is assumed that values of the call identifier word holding fields 10 and the bandwidth data holding field 11 are represented by CIW(A) and r(A).

In FIG. 2, the traffic measuring device 3 is connected to the transmitting line 5 and the call admission processing and allocating device 1. The traffic measuring device 3 measures a traffic of the call from the one of the calling stations to produce a measured traffic after the traffic measuring device 3 is supplied with the call admitted signal from the call admission processing and allocating device 1. Concretely, the traffic measuring device 3 is supplied with the cells from the calling stations through the transmitting line 5 to judge and read the call identifier words of the cells, as the traffic of the call, and to supply the call identifier words, as the measured traffic, to the effective bandwidth computing and allocating device 4.

The effective bandwidth computing and allocating device 4 is supplied with the temporary bandwidth and the call identifier word corresponding to the temporary bandwidth. Also, the effective bandwidth computing and allocating device 4 is supplied with the measured traffic. The effective bandwidth computing and allocating device 4 has a new call controlling table 12 which holds new call connection data representing data of calls each of which have the temporary bandwidth. The effective bandwidth computing and allocating device 4 further has a first memory section 13 which memorizes a parameter $\delta$ which is determined by a communication quality and a buffer amount and a second memory section 14 which memorizes first predetermined formulas. The parameter $\delta$ and the first predetermined formulas will later be described in detail. The effective bandwidth computing and allocating device 4 computes the effective bandwidth by using the measured traffic, the parameter $\delta$, and the predetermined formulas when the effective bandwidth computing and allocating device 4 is supplied with the measured traffic. The effective bandwidth computing and allocating device 4 allocates, instead of the temporary bandwidth, the effective bandwidth to the call. The effective bandwidth computing and allocating device 4 supplies the effective bandwidth to the resource controlling device 2 and makes the resource controlling device 2 allocate, instead of the temporary bandwidth, the effective bandwidth to the call.

The effective bandwidth means a necessary and minimum bandwidth for the call to satisfy requirement of the communication quality. The effective bandwidth is described in "Change: Stability, Queue Length, and Delay of Deterministic and Stochastic Queueing Networks. IEEE TRANSACTIONS ON AUTOMATIC CONTROL, VOL. 39, NO. 5, p. 913 to 931, May 1994".

The parameter $\delta$ is defined as follows. The connection admission controlling system controls admission of the call to the link which a fixed bandwidth having a buffer of a fixed length. It is assumed that requirement of communication quality that is required to the link is determined by a cell overflow ratio Psat. The parameter $\delta$ is given by a following formula (1).

$$\delta = \frac{1}{q} \log P_{sat} \tag{1}$$

where q represents a length of a buffer. The parameter $\delta$ is calculated and renewed only when requirement of the communication quality is changed.

Figure 4:
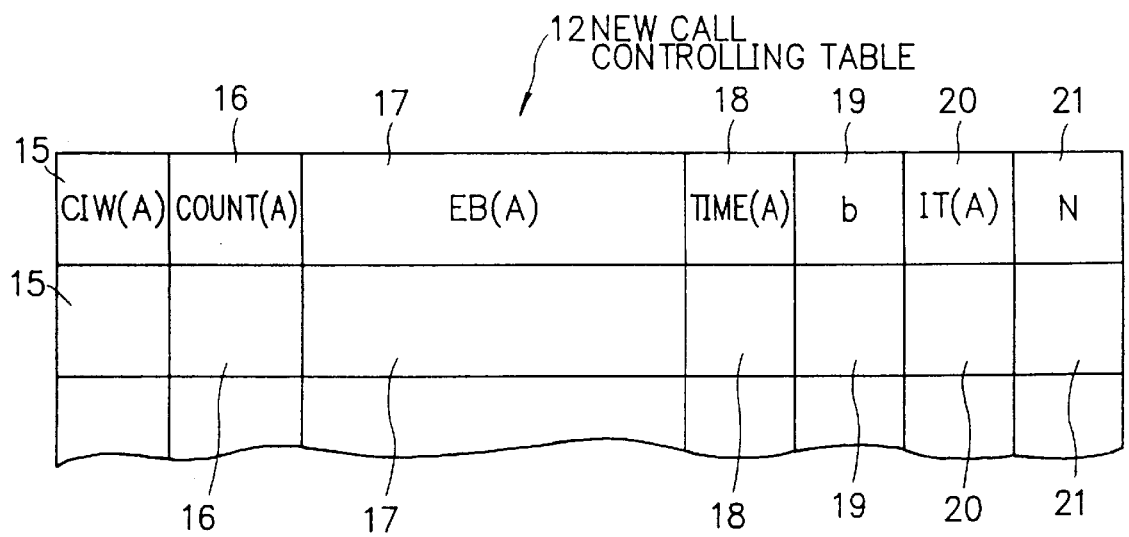
FIG. 4 is a view for use in describing an effective bandwidth computing and allocating device of the connection admission controlling system illustrated in FIG. 2.

In FIG. 4, the new call controlling table 12 has call identifier word holding fields 15, cell counting fields 16, effective bandwidth computing fields 17, measure time counting fields 18, measure time holding fields 19, repeat times counting fields 20, and repeat times holding fields 21.

Figure 5:
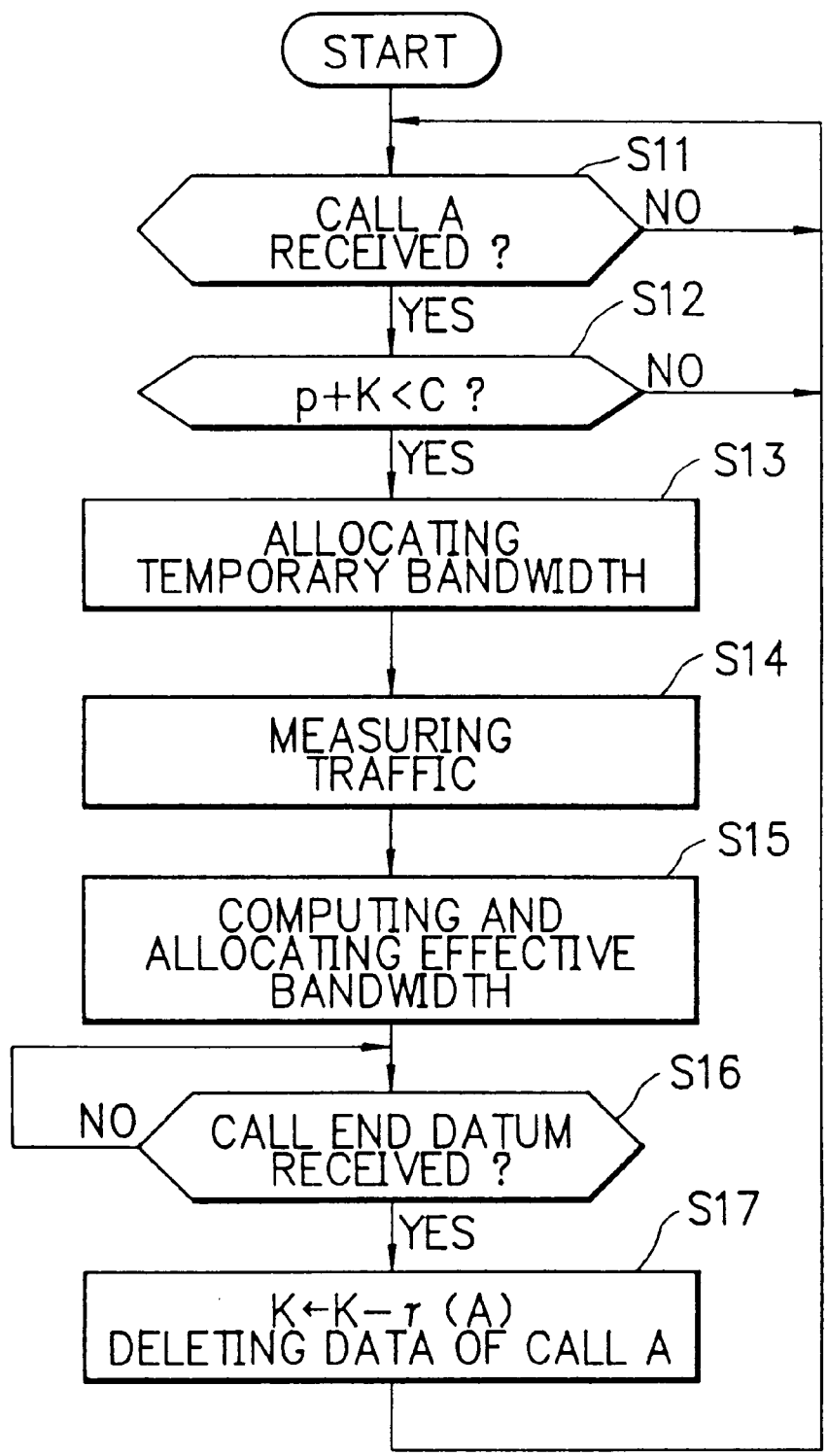
FIG. 5 is a flow chart for use in describing operation of the connection admission controlling system illustrated in FIG. 2.
Figure 6:
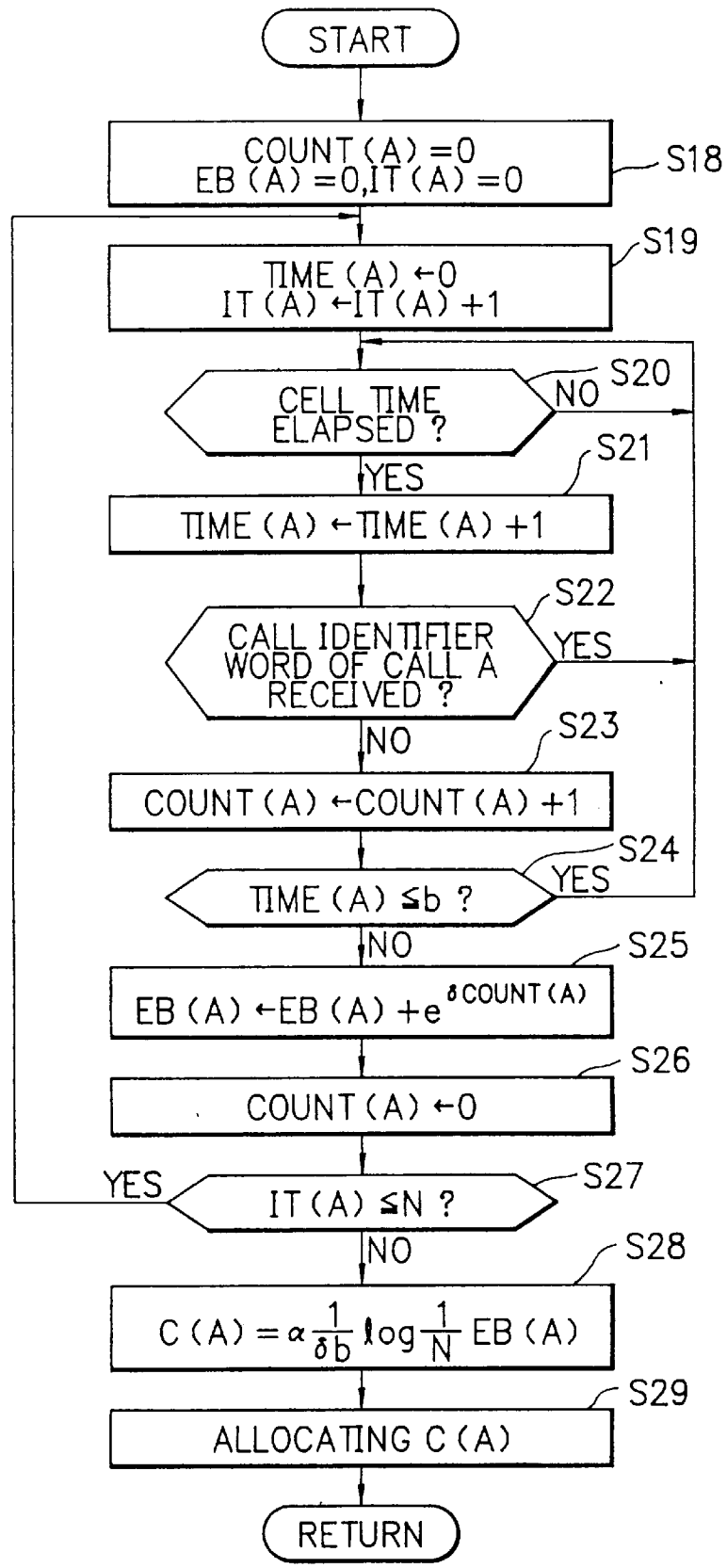
FIG. 6 is a flow chart for use in minutely describing a part of the flow chart illustrated in FIG. 5.

Referring to FIGS. 5 and 6 together with FIGS. 2 to 4, operation of the connection admission controlling system will be described in detail. It is assumed that the connection admission controlling system is supplied with the call A from one of the calling stations. The traffic descriptor has the peak rate of the traffic of the call that is proposed. Since it is easy to police a cell stream in response to the peak rate of the traffic, an adequate cell stream policing device can prevent admission of the cells which are greater than the peak rate of the traffic. The connection admission controlling system polices the cell stream in response to the peak rate of the traffic of the call that is proposed, the connection admission controlling system prevents admission of the cells which are greater than the peak rate.

In FIG. 5, at a step S1, the call admission processing and allocating device 1 judges whether or not the device 1 is supplied with the call A, namely, whether or not the device 1 is supplied with the call identifier word of the connectivity cell of the call A. It is assumed that the traffic descriptor of the connectivity cell of the call A has the peak rate p. When the device 1 is supplied with the connectivity cell of the call A, the step S11 proceeds to a step S12. Otherwise, the step S11 is repeated again. At the step S12, the device 1 judges, in response to the peak rate p, whether or not the call A is admitted. Namely, the device 1 judges whether or not (p+K) is smaller than c. When (p+K) is smaller than c, the device 1 produce a call admitted signal and the step S12 proceeds to a step S13. Otherwise, the step S12 returns to the step S1. Namely, admission of the call A is rejected.

At the step S13, the device 1 allocates, as the temporary bandwidth, the peak rate p to the call A. Concretely, allocation of the temporary bandwidth is carried out by renewing a content of K into (K+p). At the same time, the resource controlling device 2 enters the call identifier word of the call A in one of the call identifier word holding fields 10 of the connection call controlling table 7 and enters p in one of the bandwidth data fields 11 that corresponds to the one of the call identifier word holding fields 10. Also, the effective bandwidth computing and allocating device 4 enters the call identifier word of the call A in one of the call identifier word holding fields 15 of the new call controlling table 12. Thereafter, when the call is entered in the new call controlling table 12, it is assumed that contents of the call identifier word holding field 15, the cell counting field 16. the effective bandwidth computing field 17, the measure time counting field 18, and the repeat times counting field 20 which correspond to the call A are represented by CIW(A), COUNT(A). EB(A), TIME(A), and IT(A) as shown in FIG. 4. The values of COUNT(A), EB(A), TIME(A), and IT(A) is initialized to be set at 0 at a time of starting the measurement of the traffic. Also, a predetermined measuring time b and a predetermined repeat times N are stored in the measure time holding field 19 and the repeat times holding field 21, respectively. Each of b and N represents an integer greater than two.

The step S13 proceeds to a step S14 at which the traffic measuring device 3 measures the traffic of the call A to produce the measured traffic after the traffic measuring device 14 is supplied with the call admitted signal. The step S14 proceeds to a step S15 at which the effective bandwidth computing and allocating device 4 computes the effective bandwidth by using the measured traffic when the effective bandwidth computing and allocating device 4 is supplied with the measured traffic. The effective bandwidth computing and allocating device 4 allocates the effective bandwidth to the call A. The effective bandwidth computing and allocating device 4 supplies the effective bandwidth to the resource controlling device 2 and makes the resource controlling device 2 enter the effective bandwidth in the bandwidth data holding field 11 corresponding to the call A. Thereafter, the effective bandwidth computing and allocating device 4 deletes the data of the call A from the new call controlling table 12.

Referring to FIGS. 6 together with FIGS. 2 to 4, operation of the step S15 will be described in detail.

At a step S18. the values of COUNT(A), EB(A), and IT(A) is initialized to be set at 0. The step S18 proceeds to a step S19 at which the value of TIME(A) is set at 0 and the value of IT(A) is set at (IT(A)+1). The step S19 proceeds to a step S20 at which the effective bandwidth computing and allocating device 4 judges whether or not a cell time is elapsed. When the cell time is elapsed, the step S20 proceeds to a step S21. Otherwise, the step S20 is repeated. At the step S21, the value of TIME(A) is set at (TIME(A)+1) The step S21 proceeds to a step S22 at which the effective bandwidth computing and allocating device 4 judges whether or not the call identifier word of the call A is received. When the call identifier word of the call A is received, the step S22 proceeds to a step S23. Otherwise, the step S22 returns to the step 20. At the step S23, the value of COUNT(A) is set at (COUNT(A)+1). The step S23 proceeds to a step S24 at which the effective bandwidth computing and allocating device 4 judges whether or not the value of TIME(A) is smaller than b. When the value of TIME(A) is smaller than b, the step 24 returns to the step S20. Otherwise. the step 24 proceeds to a step S25 at which the value of EB(A) is computed by using a following formula (2) and is set.

$$EB(A)=EB(A)+e^{\delta \cdot COUNT(A)} \qquad (2)$$

The formula (2) is memorized in the second memory section 14.

The step 25 proceeds to a step S26 at which the value of COUNT(A) is set at 0. The step S26 proceeds to a step S27 at which the effective bandwidth computing and allocating device 4 judges whether or not the value of IT(A) is smaller than N. When the value of IT(A) is smaller than N. the step 27 returns to the step S19. Otherwise, the step 27 proceeds to a step S28 at which the effective bandwidth computing and allocating device 4 computes the effective bandwidth c(A) by using a following formula (3).

$$c(A) = \alpha \frac{1}{\delta b} \log\left(\frac{1}{N} EB(A)\right) \qquad (3)$$

where a represents a coefficient which estimates a safety value with regard to a dispersion of an estimated value. This formula (3) is memorized in the second memory section 14. The formula (3) is described in "Duffield et al.: Entropy of ATM Traffic Streams: A Tool for Estimating QoS Parameters IEEE JOURNAL ON SELECTED AREAS IN COMMUNICATIONS. VOL. 13. NO. 6. p. 981 to 990 AUGUST 1995".

The step 28 proceeds to a step S29 at which the effective bandwidth computing and allocating device 4 allocates the effective bandwidth c(A) to the call A. The effective bandwidth computing and allocating device 4 supplies the effective bandwidth c(A) to the resource controlling device 2 and makes the resource controlling device 2 enter the effective bandwidth c(A) in the bandwidth data holding field 11 corresponding to the call A. Concretely, the value of K is set at (K−r(A)+c(A)). Next, the value of r(A) is set at c(A). Thereafter, the effective bandwidth computing and allocating device 4 deletes the data of the call A from the new call controlling table 12.

Turning back to FIG. 5, the step 15 proceeds to a step S16 at which the resource controlling device 2 judges whether or not the call end datum is received. When the call end datum is received. the step S16 proceeds to a step S17. Otherwise. the step S16 is repeated. At the step S17, the value of K is set at (K−r(A)). Also, the resource controlling device 2 deletes data of the call A in the connection call controlling table 7. In addition, the operation of the steps 14 and 15 is, in parallel, carried out on the calls which are held in the new call controlling table 12 of the effective bandwidth computing and allocating device 4.

Figure 7:
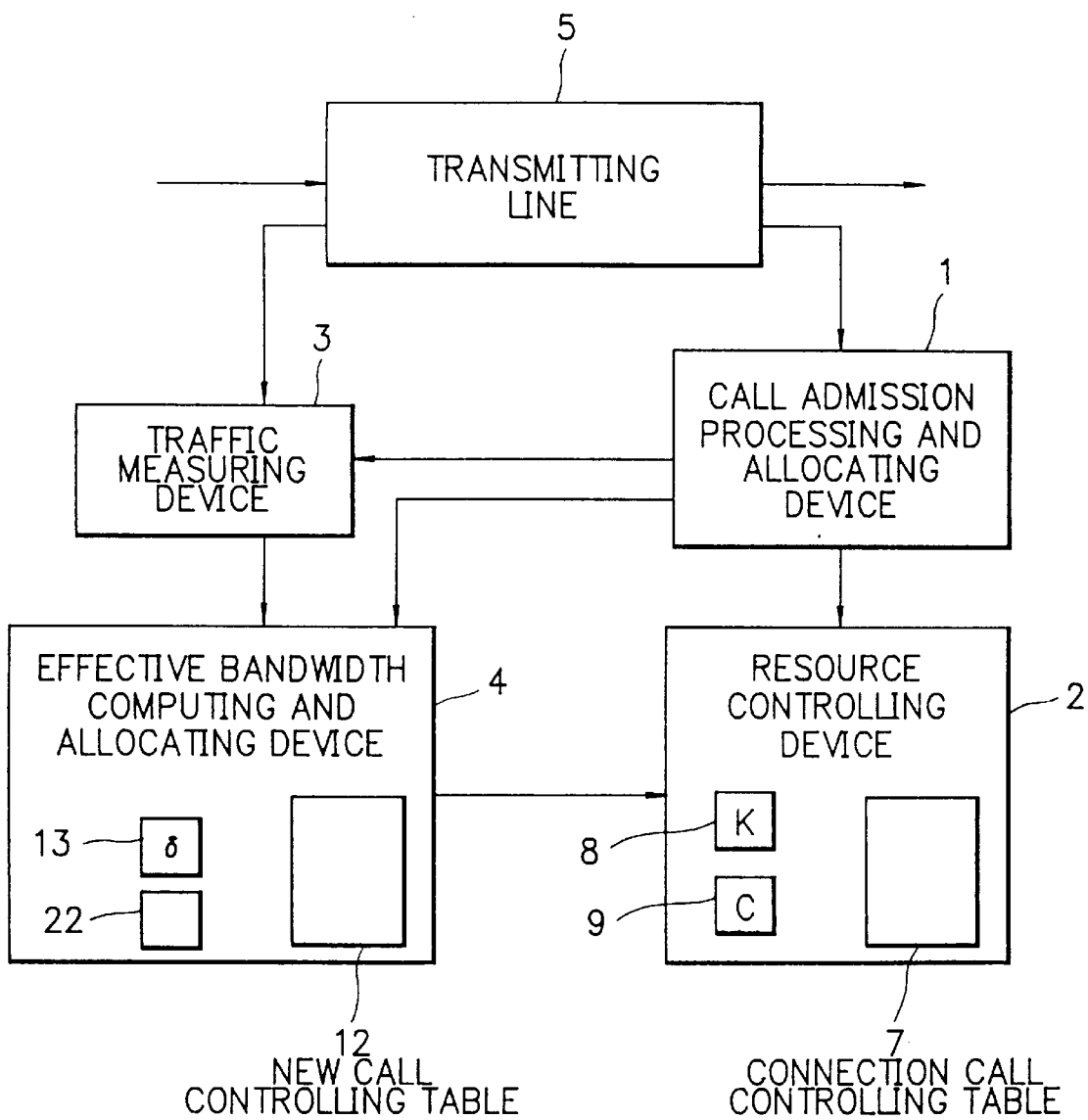
FIG. 7 is a block diagram of a connection admission controlling system according to a second embodiment of this invention.
Figure 8:
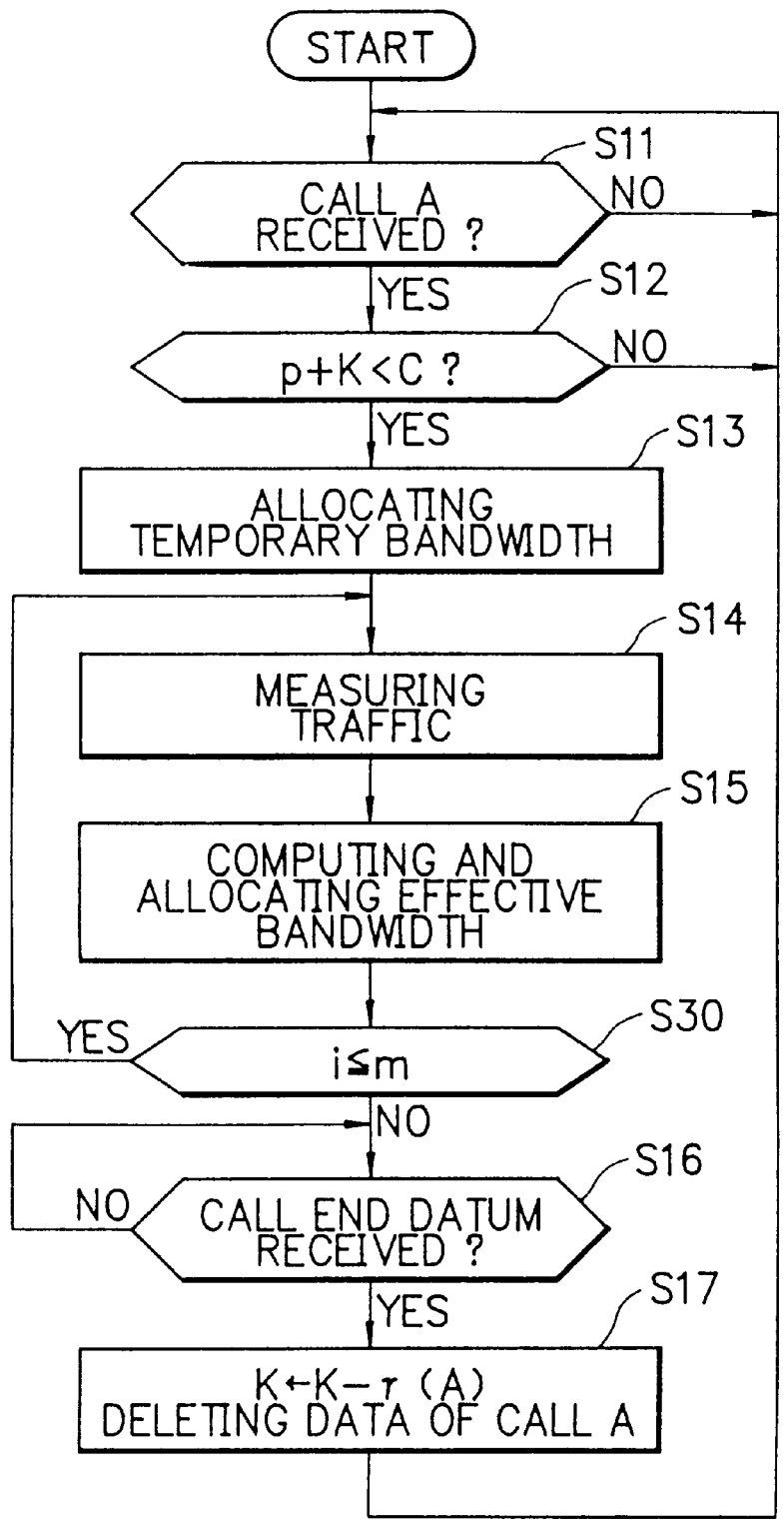
FIG. 8 is a flow chart for use in describing operation of the connection admission controlling system illustrated in FIG. 7.
Figure 9:
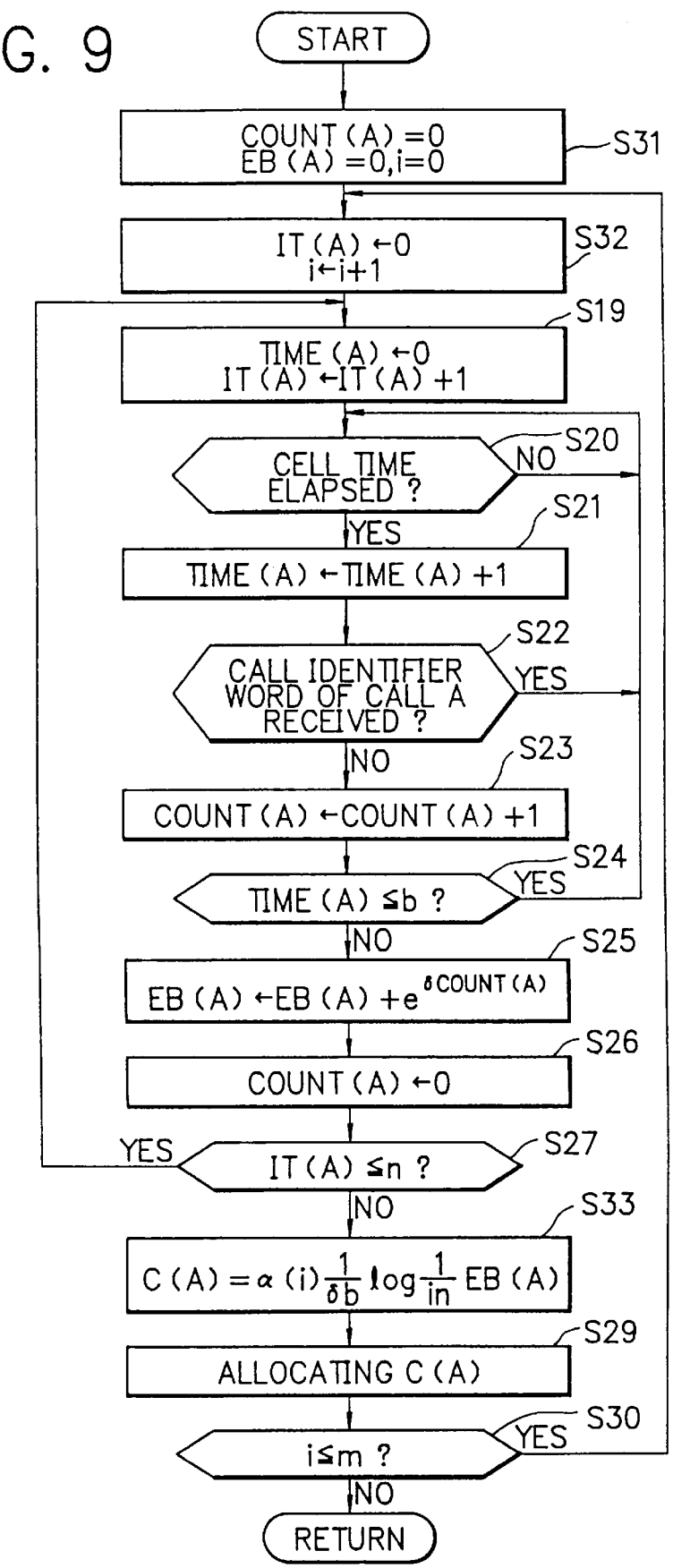
FIG. 9 is a flow chart for use in minutely describing a part of the flow chart illustrated in FIG. 8.

Referring to FIGS. 7, 8, and 9, the description will proceed to connection admission controlling system and method according to a second embodiment of this invention. Similar parts are designated by like reference numerals.

In FIG. 7, the connection admission controlling system comprises the call admission processing and allocating device 1, the resource controlling device 2, the traffic measuring device 3, and the effective bandwidth computing and allocating device 4. The effective bandwidth computing and allocating device 4 has, instead of the second memory section 14, a third memory section 22 which memorizes the predetermined formula (2) and a predetermined formula (4).

Referring to FIGS. 8 and 9 together with FIGS. 2 to 7, operation of the connection admission controlling system will be described in detail. The operation of the connection admission controlling system comprises the steps S11 to S17 and a step S30. The step S11, in serial order, procedes the steps S12 to S15. The step S15 proceeds to the step S30 at which the effective bandwidth computing and allocating device 4 judges whether or not an allocating times i is smaller than m where m represents an integer greater than two. When the allocating times i is smaller than m, the step S30 returns to the step 14. Otherwise, the step S30 proceeds to the step S16.

Referring to FIG. 9 together with FIGS. 2 to 8, operation of the steps S14 and S15 will be described in detail. It is assumed that N is equal to a value which is made by multiplying n by m, where each of n and m is integer greater than one. The operation of the steps S14 and S15 comprises the steps S19 to S29 and steps S31 and S33.

At the step 31, values of COUNT(A), EB(A), and i are set at 0. The step 31 proceeds to the step S32 at which the value of IT(A) is set at 0 and the value of i is set at (i+1). The step S32, in serial order, proceeds the steps S19 to S27. At the step S27, when IT(A) is not smaller than n, the step proceeds to the step S33. At the step S33. the effective bandwidth computing and allocating device 4 computes the effective bandwidth c(A) by using the following formula (4).

$$c(A) = \alpha(i)\frac{1}{\delta b}\log\left(\frac{1}{in}EB(A)\right) \quad (4)$$

The step 33 proceeds to a step S29 at which the effective bandwidth computing and allocating device 4 allocates the effective bandwidth c(A) to the call A. The effective bandwidth computing and allocating device 4 supplies the effective bandwidth c(A) to the resource controlling device 2 and makes the resource controlling device 2 enter the effective bandwidth c(A) in the bandwidth data holding field 11 corresponding to the call A. Concretely, the value of K is set at (K−r(A)+c(A)). Next, the value of r(A) is set at c(A). Thereafter, the effective bandwidth computing and allocating device 4 deletes the data of the call A from the new call controlling table 12. The step 29 proceeds to the step S30.

While this invention has thus far been described in conjunction with two preferred embodiments thereof, it will readily be possible for those skilled in the art to put this invention into practice in various other manners. For example, different values of b and N may be held in the call admission processing and allocating device 1 in response to the kinds of the calls or the service classes. In this event, the different values of b and N may be set in response to kinds of the calls or service classes. In addition, the kinds of the calls are proposed by the user by use of the calling station.

What is claimed is:

1. A connection admission controlling system comprising:

judging means for judging whether or not a call from one of calling stations is admitted in response to a peak rate of a traffic that is indicated by a connectivity restriction of a connectivity cell from the one of said calling stations to produce a call admitted signal when said call is admitted;

first allocating means connected to said judging means for allocating, as a temporary bandwidth, said peak rate to said call when said allocating means is supplied with said call admitted signal;

measuring means connected to said first allocating means for measuring a traffic of said call from the one of said calling stations to produce a measured traffic after said measuring means is supplied with said call admitted signal;

computing means connected to said measuring means for computing an effective bandwidth by using said measured traffic when said computing means is supplied with said measured traffic; and second allocating means connected to said computing means for allocating said effective bandwidth to said call when said second allocating means is supplied with said effective bandwidth.

2. A connection admission controlling system comprising:

judging means for judging whether or not a call from one of calling stations is admitted in response to a peak rate of a traffic that is indicated by a connectivity restriction of a connectivity cell from the one of said calling stations to produce a call admitted signal when said call is admitted;

first allocating means connected to said judging means for allocating, as a temporary bandwidth, said peak rate to said call when said allocating means is supplied with said call admitted signal;

measuring means connected to said first allocating means for measuring traffics of said call from the one of said calling stations to produce measured traffics after said measuring means is supplied with said call admitted signal;

computing means connected to said measuring means for gradually computing first through m-th effective bandwidths by using said measured traffics when said computing means is supplied with said measured traffics from said measuring means, where m represents an integer greater than two; and second allocating means connected to said computing means for allocating said first through m-th effective bandwidths to said call, respectively, when said second allocating means is supplied with said first through m-th effective bandwidths.

3. A connection admission controlling system comprising:

a call admission processing and allocating device for judging whether or not a call from one of calling stations is admitted in response to a peak rate of a traffic that is indicated by a connectivity restriction of a connectivity cell from the one of said calling stations to produce a call admitted signal when said call is admitted, said call admission processing and allocating device allocating, as a temporary bandwidth, said peak rate to said call when said call admitted signal is produced;

a resource controlling device connected to said call admission processing and allocating device and having a connection call controlling table which holds call connection data of calls each of which has at least one of said temporary bandwidth and an effective bandwidth, said connection call controlling table holds said temporary bandwidth and said effective bandwidth when said resource controlling device is supplied with said temporary bandwidth from said call admission processing and allocating device and said effective bandwidth, said resource controlling device controlling usage of a link by using said call connection data of said calls;

a traffic measuring device connected to said call admission processing and allocating device for measuring a traffic of said call from the one of said calling stations to produce a measured traffic after said traffic measuring device is supplied with said call admitted signal; and an effective bandwidth computing and allocating device connected to said call admission processing and allocating device, said traffic measuring device, and said resource controlling device and having a new call controlling table which holds new call connection data representing data of calls each of which have said temporary bandwidth, said effective bandwidth computing and allocating device computing said effective bandwidth by using said measured traffic when said effective bandwidth computing and allocating device is supplied with said measured traffic, said effective bandwidth computing and allocating device allocating said effective bandwidth to said call and supplying said effective bandwidth to said resource controlling device.

4. A connection admission controlling system as claimed in claim 3, wherein:

said call admission processing and allocating device further supplied with a present bandwidth which presently is used in said link and a whole bandwidth of said link from said resource controlling device, said call admission processing and allocating device judging whether or not said call is admitted in response to said peak rate, said present bandwidth, and said whole bandwidth of said link to produce said call admitted signal when said call is admitted, said call admission processing and allocating device allocating, as said temporary bandwidth, said peak rate to said call when said call admitted signal is produced;

said resource controlling device further comprises a first resource memory section which memorizes said present bandwidth which presently is used in said link and a second resource memory section which memorizes said whole bandwidth of said link, said resource controlling device controlling usage of said link by using said call connection data of said calls, said present bandwidth, and said whole bandwidth of said link; and said effective bandwidth computing and allocating device further having a first memory section which memorizes a parameter which is determined by a communication quality and a buffer amount and a second memory section which memorizes predetermined formulas, said effective bandwidth computing and allocating device computing said effective bandwidth by using said measured traffic, said parameter, and said predetermined formulas when said effective bandwidth computing and allocating device is supplied with said measured traffic, said effective bandwidth computing and allocating device allocating said effective bandwidth to said call and supplying said effective bandwidth to said resource controlling device.

5. A connection admission controlling system comprising:

a call admission processing and allocating device for judging whether or not a call from one of calling stations is admitted in response to a peak rate of a traffic that is indicated by a connectivity restriction of a connectivity cell from the one of said calling stations to produce a call admitted signal when said call is admitted, said call admission processing and allocating device allocating, as a temporary bandwidth, said peak rate to said call when said call admitted signal is produced;

a resource controlling device connected to said call admission processing and allocating device and having a connection call controlling table which holds call connection data of calls each of which has at least one of said temporary bandwidth and an effective bandwidth, said connection call controlling table holds said temporary bandwidth and said effective bandwidth when said resource controlling device is supplied with said temporary bandwidth from said call admission processing and allocating device and said effective bandwidth, said resource controlling device controlling usage of a link by using said call connection data of said calls;

a traffic measuring device connected to said call admission processing and allocating device for measuring traffics of said call from the one of said calling stations to produce measured traffics after said traffic measuring device is supplied with said call admitted signal; and an effective bandwidth computing and allocating device connected to said call admission processing and allocating device, said traffic measuring device, and said resource controlling device and having a new call controlling table which holds new call connection data representing data of calls each of which have said temporary bandwidth, said effective bandwidth computing and allocating device gradually computing first through m-th effective bandwidths by using said measured traffics when said computing means is supplied with said measured traffics from said traffic measuring device, where m represents an integer greater than two, said effective bandwidth computing and allocating device allocating said first through m-th effective bandwidths to said call, respectively, said effective bandwidth computing and allocating device supplying said first through m-th effective bandwidths to said resource controlling device.

6. A connection admission controlling method comprising;

a first step of judging whether or not a call from one of calling stations is admitted in response to a peak rate of a traffic that is indicated by a connectivity restriction of a connectivity cell from the one of said calling stations to produce a call admitted signal when said call is admitted;

a second step of allocating, as a temporary bandwidth, said peak rate to said call in response to said call admitted signal;

a third step of measuring a traffic of said call from the one of said calling stations to produce a measured traffic after reception of said call admitted signal;

a fourth step of computing an effective bandwidth by using said measured traffic; and a fifth step of allocating said effective bandwidth to said call.

7. A connection admission controlling method comprising:

a first step of judging whether or not a call from one of calling stations is admitted in response to a peak rate of a traffic that is indicated by a connectivity restriction of a connectivity cell from the one of said calling stations to produce a call admitted signal when said call is admitted;

a second step of allocating, as a temporary bandwidth, said peak rate to said call in response to said call admitted signal;

a third step of measuring traffics of said call from the one of said calling stations to produce measured traffics after reception of said call admitted signal;

a fourth step of gradually computing first through m-th effective bandwidths by using said measured traffics where m represents an integer greater than two; and a fifth step of allocating said first through m-th effective bandwidths to said call, respectively.

8. A connection admission controlling system comprising:

call admission judging portion for judging whether or not a call from one of calling stations is admitted in response to a peak rate of a traffic that is indicated by a connectivity restriction of a connectivity cell from the one of said calling stations to produce a call admitted signal when said call is admitted;

first allocating device connected to said call admission judging portion for allocating, as a temporary bandwidth, said peak rate to said call when said allocating device is supplied with said call admitted signal;

measuring device connected to said first allocating device for measuring a traffic of said call from the one of said calling stations to produce a measured traffic after said measuring device is supplied with said call admitted signal;

computing device connected to said measuring device for computing an effective bandwidth by using said measured traffic when said computing device is supplied with said measured traffic; and second allocating device connected to said computing device for allocating said effective bandwidth to said call when said second allocating device is supplied with said effective bandwidth.

9. A connection admission controlling system comprising:

call admission judging portion for judging whether or not a call from one of calling stations is admitted in response to a peak rate of a traffic that is indicated by a connectivity restriction of a connectivity cell from the one of said calling stations to produce a call admitted signal when said call is admitted;

first allocating device connected to said judging device for allocating, as a temporary bandwidth, said peak rate to said call when said allocating device is supplied with said call admitted signal;

measuring device connected to said first allocating device for measuring traffics of said call from the one of said calling stations to produce measured traffics after said measuring device is supplied with said call admitted signal;

computing device connected to said measuring device for gradually computing first through m-th effective bandwidths by using said measured traffics when said computing device is supplied with said measured traffics from said measuring device, where m represents an integer greater than two; and second allocating device connected to said computing device for allocating said first through m-th effective bandwidths to said call, respectively, when said second allocating device is supplied with said first through m-th effective bandwidths.

* * * * *